Patented Jan. 30, 1940

2,188,863

UNITED STATES PATENT OFFICE 2,188,863

GREASE AND METHOD OF MAKING THE SAME

Samuel Edward Jolly, Prospect Park, and Wesley McIlveen McKee, Bortondale, Pa., assignors to Sun Oil Company, Philadelphia, Pa., a corporation of New Jersey No Drawing. Application September 5, 1936, Serial No. 99,642

11 Claims. (Cl. 87—9)

The object of this invention is to provide a grease for mechanical lubrication which is superior to existing greases which are made by incorporating certain metal soaps of saponifiable fats or fatty acids of animal or vegetable origin in lubricating oils.

It is well known that lubricating greases made by treating fats or fatty acids of vegetable or animal origin with saponifying agents and incorporating the resulting soaps in mineral oils have characteristics which preclude their satisfactory employment under certain conditions.

For instance, lime greases made by incorporating the calcium soaps produced from vegetable or animal fats or fatty acids in mineral oils cannot be satisfactorily used where the temperature of operation will be in excess of 225° F. due to their low melting points. Greases of this type cannot be heated to temperatures greatly in excess of their melting points and without separation of the soaps from the lubricating oils. This separation is due to the removal of the moisture which is necessary to stabilize the suspension of the soap in the mineral oil. Lubricating greases made from the calcium soaps produced from vegetable or animal fats or fatty acids are also unsuited for use under conditions where they are subjected to mechanical agitation as they lose body. This precludes their satisfactory use in transmissions, gear trains, roller bearings, etc.

In cases where vigorous mechanical agitation or high temperatures, or a combination of these conditions, exists, use must be made of greases produced by dissolving or suspending the sodium soaps produced from vegetable or animal fats or fatty acids in mineral oils. These greases are satisfactory under operating conditions where they are not subjected to moisture. When subjected to moisture they may absorb the moisture with consequent loss of body or, if enough water is present, the may form emulsions which foam badly. They may also absorb moisture with a consequent gain in body which may cause channeling around gears and subsequent mechanical failure due to lack of lubrication.

The satisfactory manufacture of lime greases from vegetable or animal fats or fatty acids involves a difficult process. The quality of the product is dependent on a number of variable conditions which are difficult to control. For instance, the body of the finished product is materially affected by the moisture content and by its degree of alkalinity. The body of the grease is also dependent, to a certain extent, on the temperature to which the grease was heated in the manufacturing process and on the rate and the conditions of cooling of the finished product.

It has been proposed to produce greases by the use in admixture with oils of metallic soaps produced from the acidic products of the oxidation of petroleum hydrocarbons. The greases of this type heretofore produced, however, are quite unsatisfactory for practical purposes since they break down in the presence of moisture, do not have uniform composition, and lose body upon agitation.

It has been found, in accordance with the present invention, that the above and other disadvantages may be overcome and that very desirable greases may be prepared by the use in proper fashion of the metal soaps of certain saponifiable products obtained by the liquid phase oxidation of high molecular weight solid or liquid aliphatic hydrocarbons of mineral origin.

The oxidation and separation of the products thereof may be accomplished in various fashions, preferably as described in the application of Alleman and Jolly, Serial No. 99,643 filed September 5, 1936. The hydrocarbon used as the starting point may be of any of various types, but is preferably one of high boiling point as, for example, a heavy lubricating oil, slack wax, or paraffin wax. The hydrocarbon may be oxidized by the introduction of oxygen or air in a diffused condition into the oil while the latter is at a temperature between 120° C. and 160° C. At lower temperatures the oxidation is quite slow. On the other hand, above about 170° C. the products are dark in color, and while the oxidation is rapid at first, the rate falls off toward the end of the run and the saponification value of the product decreases, indicating that decomposition has taken place. Preferably the oxidation is started at a temperature of 160° C. to 165° C. until the saponification value reaches about 40. Then the temperature may be cut down to 150° C. to 155° C. for the remainder of the run, the temperature control being effected by control of the flow of air after cutting off external heat. The time for the oxidation may vary depending upon the saponification value desired in the final product and the nature of the oxygen supply. For example, where a Turbo-Mixer is used, the same results may be attained in about twenty-four hours as require almost three times that period where the air is introduced through an ordinary type of diffuser. The details of the oxidation process, however, form no part of the present invention and need not be described in greater detail.

The products of the oxidation as they are removed from the oxidizer may have a saponification value of from 150 to 175, and without modification (except when slack wax is used as the hydrocarbon which is oxidized) are unsuitable for the manufacture of satisfactory greases. The low molecular weight acids which are present in the oxidation product react with saponifying agents to form soaps which are insoluble in, and incapable of homogeneous mixture with, mineral oils when in an anhydrous condition. These low molecular weight acids may be removed by thoroughly washing in hot water, in which they are soluble. They may be more satisfactorily separated and recovered for other uses by distillation. It was found that the product thus arrived at after removal of the low molecular weight acids, when saponified and the soap made into lime greases, gave greases which had many desirable properties, but they were not generally satisfactory as they lost their body when agitated in the presence of water. It was found that this defect could be overcome by eliminating those oxidation products which distilled below about 225° C. to 250° C. at 4 mm. and saponifying the residue remaining above this temperature. The distillation just mentioned eliminates the low molecular weight acids as well as other products.

Preferably, as the saponifiable material for the manufacture of lubricating greases there is used a fraction of the oxidation products obtained by the liquid phase oxidation of solid or liquid aliphatic hydrocarbons, which has a boiling range in excess of about 225° C. at 4 mm. pressure (a fraction representing about 50% of the total oxidation products), or, alternatively, a purified acid product obtained by the liquid phase oxidation of solid or of liquid aliphatic hydrocarbons from which the unoxidized hydrocarbons and the intermediate oxidation products which are unsaponifiable have been separated by saponifying the oxidation product with caustic soda, potash, or some other alkali which reacts with the acids present to form water-soluble soaps, adding water, heating the mixture under pressure, separating the soap solution from the unsaponifiable material, and recovering the higher molecular weight organic acids from the soap solution by the addition of mineral acids such as sulphuric acid or hydrochloric acid which precipitate the acids of higher molecular weight but not those of lower molecular weight which are water soluble. The acids thus obtained may be fractionally distilled to obtain, for saponification, those which boil above about 225° C. at 4 mm. In general this alternative procedure is unnecessary, mere distillation being sufficient to produce a satisfactory starting point, since at least the greater part of the water soluble acids is eliminated thereby. It has been found that the treatment of the oxidation products with concentrated, preferably fuming, sulphuric acid either before or after their separation gives a more desirable product. The average molecular weight of the acids thus obtained, namely, 400 to 500, results in a lower percentage of calcium or other metal in the saponified product, and it has been found desirable to add a slightly greater amount of the resulting soap to the mineral oil in order to get a grease of the desired consistency, the amount being somewhat greater than the necessary amounts of soap produced from fats or fatty acids of animal or of vegetable origin. Greases containing various metals may be produced, the most important being those containing calcium or sodium.

The calcium greases may be made by saponifying the oxidation products, purified or modified as above, with milk of lime at atmospheric or at superatmospheric pressure and adding the calcium soap thus obtained, after removal of water by heating, to mineral oils in an amount sufficient to give a grease of the desired consistency. Alternatively, they made be made by saponifying the oxidation products with milk of lime in the presence of a part or all of the mineral oil, the saponification being carried out at atmospheric or at superatmospheric pressure. As a further alternative, the lime may be suspended in a portion of the mineral oil and the acid and the remainder of the mineral oil added. The autoclave or agitator employed in the saponification process may be heated in any suitable fashion, either by direct flame, superheated steam coils, or by electrical means. As will be pointed out in the specific examples below, the saponification is preferably carried out at temperatures above 100° C. so as to eliminate water from the product during the saponification. At least part of the oil is desirably present during the dehydration so that the formation of solid soaps is avoided.

The calcium greases may also be made by first forming the calcium soap by the double decomposition of a sodium soap solution, obtained by saponification of the higher molecular weight acids indicated above, by adding an aqueous solution of a calcium salt, such as calcium chloride, and after thorough washing of the calcium soap to remove the water soluble products of the reaction, dehydrating the soap (preferably after admixture with some of the oil) and adding the oil necessary to produce the desired product.

For the formation of sodium greases, the oxidation products modified and treated as above to remove the low boiling constituents may be treated with caustic soda and the resulting soaps, after dehydration, may be dissolved in oils to give lubricating greases. The greases thus obtained have melting points 20° to 30° C. higher than greases made from vegetable or animal fats or fatty acids, but they lose body under mechanical agitation. For example, a soda grease containing 5% of the sodium soap of a modified oxidation product having a saponification number of 132.2, which grease has had an initial MacMichael viscosity of 15, had a viscosity of 6 after running for seven hours in a transmission. Another sample containing 10% of sodium soap dropped from a MacMichael viscosity of 85 to one of 10 after running for twelve hours in a transmission. These greases, however, have uses in special instances where violent mechanical agitation does not occur. It has been found that by the addition of 2 to 25% of the oxidation products of aliphatic hydrocarbons to tallow or other vegetable or animal fats, saponification of the mixture with caustic soda, and solution of the soap in mineral oil, there is obtained a grease which has a melting point about 20° C. higher than a grease made by saponifying tallow alone with caustic soda under otherwise identical conditions. Soda greases made from tallow have a long fibre and are stringy in character. The grease made by using a small amount of the oxidation products of aliphatic hydrocarbons, together with tallow, has a short fibre and will maintain this characteristic in service despite violent mechanical agitation so long as the percentage of oxidation products is kept below about 10% of the tallow used. This is a very desirable feature and the mixed type of grease thus obtained has many applications. When the oxidation products and tallow are used in admixture it is not necessary to remove either the low molecular weight acids or the low boiling oxidation products in order to receive a homogeneous grease of satisfactory nature, so long as the oxidation products are used in amounts less than about 25% of the tallow.

If slack wax containing about 15% to 35% of oil is used as the hydrocarbon which is oxidized to produce the soap acids, it is found that products are obtained which are completely satisfactory even without the elimination of low boiling products, i. e. those boiling below about 225° C. at 4 mm. and, in fact, even without the elimination of non-saponifiable oxidation products from the soaps. It is desirable, however, to eliminate the water soluble low molecular weight acids since their soaps are comparatively insoluble in oils.

As examples of the preparation of greases in accordance with the above, there may be cited the following:

Paraffin wax having a melting point of 133° F. to 135° F. and an average molecular weight of 315 was oxidized in the liquid phase at an average temperature of about 150° C. until the saponification value was 160. This oxidation product was distilled to a temperature of 255° C. at 4 mm. and the residue, having a saponification number of 120, was employed in the manufacture of grease.

Forty pounds of this residue was added to an equal weight of mineral lubricating oil having a viscosity of 300 seconds, Saybolt, at 100° F. in an agitator which was closed so that the saponification could take place under pressure. 4.4 pounds of calcium hydroxide was added as milk of lime, and the saponification completed at a temperature of 120° C. to 140° C. The cover of the agitator was then removed and the mixture further heated until dehydration was effected, whereupon 120 pounds of lubricating oil having a viscosity of 300 seconds, Saybolt, at 100° F. was added. The mixture was heated to a temperature of 125° C. to 150° C. until solution took place to form the grease.

Slack wax or heavy oils may be used in place of the paraffin wax in the above example.

In another instance slack wax containing about 20% free oil and having an average molecular weight of 337 was oxidized in the liquid phase between 150° C. to 160° C. until the oxidation product had a saponification value of 110. This product was treated in a pressure tank with sufficient caustic soda to neutralize the acids present. Water to the extent of 40 to 50% of the oxidation product was added and the mixture heated to a temperature of about 150° C. in order to effect separation of the soap solution from the unsaponifiable material. Air pressure was then applied to the mixture to prevent reemulsification of the mixture due to boiling as it cooled.

After cooling, the soap solution, free of unsaponifiable material, was withdrawn from the bottom of the pressure tank and the organic acids recovered by the addition of mineral acid. The precipitated organic acids were washed free of mineral acids and water soluble organic acids.

The saponification number of a dehydrated sample of the acids thus obtained was about 130, the recovery of this acid amounting to about 60% by weight of the starting material. Considering this fact, it would be expected that the saponification value of the recovered acids would be higher, but a considerable amount of water-soluble acids of low molecular weight and high saponification value was lost in the purification.

Twenty-five pounds of the resulting mixture of higher boiling acids was added to an agitator containing an equal weight of oil and 3.3 pounds of calcium hydroxide was added in the form of milk of lime. The agitator was sealed and the mixture heated to a temperature of 120° C. to 130° C. The agitator was then opened, the mixture dehydrated, and further oil added to give a grease of the desired consistency. The entire mixture was then heated to a temperature of 125° C. to 150° C. in order to insure complete solution of the metal soap in the oil, which complete solution continued upon cooling. The oil used in this case had a viscosity of 300 seconds, Saybolt, at 100° F.

In another case 150 pounds of the oxidation products from paraffin wax having lower boiling fractions separated by distillation to 225° C. at 4 mm. and having a saponification number of 120, was added to 1350 pounds of tallow and 500 pounds of mineral oil having a viscosity of 300 seconds, Saybolt, at 100° F. The mixture was saponified by adding 470 pounds of 47° Bé. caustic soda solution. After saponification was complete 5500 pounds of mineral oil of the same type as that previously present were slowly added and the temperature raised to about 180° C. to completely eliminate water. The resulting product had a melting point of about 180° C., which is about 14° C. higher than a straight tallow grease made under similar conditions. The grease containing the sodium soap of the oxidation product has a short fibre in contrast to the longer fibre of the straight tallow grease. The calcium soaps may be used instead of the sodium soaps in this grease.

When it is desired to produce calcium greases by the transposition of sodium soaps to calcium soaps by double decomposition, the various general procedures outlined above may be used. For example, paraffin wax, slack wax, or some other mixture of petroleum hydrocarbons may be oxidized under the conditions indicated above and the product distilled up to 225° C. at 4 mm., which will remove, in general, about 50% of the products initially obtained. The residue may be saponified in the usual fashion with sodium hydroxide, preferably at elevated temperatures, and with or without the application of pressure. The resulting water-soluble sodium soaps are then removed from the water-insoluble materials present in the manner outlined above, and the soap solution is treated with a solution of a calcium salt, for example, calcium chloride. The resulting precipitated heavy calcium soap is washed free of soluble materials, the wet precipitate is added to the necessary amount of lubricating oil, or a part thereof, and the mixture heated until substantial dehydration is accomplished and a solution of the calcium soap in the oil formed. In place of a soluble calcium salt there may be used a soluble salt of some other heavy metal which will produce a water-insoluble soap.

In any of the above procedures, while not specifically mentioned, the oxidation products may be treated before saponification with concentrated sulphuric, preferably fuming, acid. As a result of such treatment, some undesirable constituents are removed as water-soluble products which may be separated by washing.

Soaps of other metals than calcium or sodium may be used for the formation of greases of the type herein described. Such soaps are preferably produced by the double decomposition of sodium soaps with soluble salts of the metals concerned, for example, barium, magnesium, aluminum, lead and zinc. Potassium soaps may be produced by direct saponification with caustic potash, the procedure being substantially the same as in the case of the preparation of the sodium soaps.

The calcium greases are true solutions of the metal salts of the high boiling acids in oil. As a consequence, they do not require the presence of moisture to render them stable or to give body to the grease, and they may be manufactured in an anhydrous condition by adding the anhydrous soap to the oil. A small amount of moisture left in one of these greases has no effect upon its body. The moisture may be driven out of the grease under operating conditions without causing a change in its consistency. The calcium greases may be repeatedly heated to temperatures as high as 260° C. and cooled without separation or decomposition. They are stable to mechanical agitation and may be satisfactorily used in transmissions, gear trains, roller bearings, etc. Their melting points are 10° C. to 15° C. higher than those of the calcium greases made from vegetable or animal fats or fatty acids. They are of short fibre and a very buttery consistency and do not require further treatment such as milling to yield a smooth product. Furthermore, these greases do not have any tendency to bleed or slowly separate their oil as do the calcium greases of the vegetable or animal fats or fatty acids.

There is also the advantage that the calcium greases are easily manufactured because no moisture content is required in the finished product. They are not sensitive to an excess amount of lime and they are entirely unaffected by the rate or conditions of cooling.

The sodium greases are satisfactory under some conditions but, as indicated above, lose body under mechanical agitation. The greases formed by the saponification of a mixture of the oxidation products herein described and tallow, however, are very useful and have the properties indicated above.

The greases containing other heavy metals have properties somewhat similar to those of the calcium greases and may be used under special circumstances. The potassium greases resemble, to a considerable degree, the sodium greases.

What we claim and desire to protect by Letters Patent is:

1. A substantially anhydrous lubricating grease comprising a lubricating oil, and a substantial quantity of oil-soluble soap of water insoluble saponifiable materials boiling only above about 225° C. at 4 mm. pressure produced by the partial liquid phase oxidation of aliphatic petroleum hydrocarbons and substantially free of soaps of such saponifiable materials boiling below about 225° C. at 4 mm. pressure.

2. A substantially anhydrous lubricating grease comprising a lubricating oil and a substantial quantity of oil-soluble calcium soap of water-insoluble saponifiable materials boiling only above about 225° C. at 4 mm. pressure produced by the partial liquid phase oxidation of aliphatic petroleum hydrocarbons, and substantially free of soaps of such saponifiable materials boiling below about 225° C. at 4 mm. pressure.

3. A substantially anhydrous lubricating grease comprising a lubricating oil and a mixture of substantial quantities of each of soaps of higher fatty acids of vegetable or animal origin and of soaps of water-insoluble saponifiable materials produced by the partial liquid phase oxidation of aliphatic petroleum hydrocarbons, and substantially free of soaps of water-soluble saponifiable materials.

4. A substantially anhydrous lubricating grease comprising a lubricating oil and a mixture of substantial quantities of each of sodium soaps of higher fatty acids of vegetable or animal origin and of soaps of water-insoluble saponifiable materials produced by the partial liquid phase oxidation of aliphatic petroleum hydrocarbons, and substantially free of soaps of water-soluble saponifiable materials.

5. A substantially anhydrous lubricating grease comprising a lubricating oil and a mixture of substantial quantities of each of soaps of higher fatty acids of vegetable or animal origin and of soaps of water-insoluble saponifiable materials boiling only above about 225° C. at 4 mm. pressure produced by the partial liquid phase oxidation of aliphatic petroleum hydrocarbons and substantially free of soaps of such saponifiable materials boiling below about 225° C. at 4 mm. pressure.

6. A substantially anhydrous lubricating grease comprising a lubricating oil and a mixture of substantial quantities of each of sodium soaps of higher fatty acids of vegetable or animal origin and of sodium soaps of water-insoluble saponifiable materials boiling only above about 225° C. at 4 mm. pressure produced by the partial liquid phase oxidation of aliphatic petroleum hydrocarbons, and substantially free of soaps of such saponifiable materials boiling below about 225° C. at 4 mm. pressure.

7. The process comprising partially oxidizing aliphatic petroleum hydrocarbons in liquid phase, removing from the oxidized product materials boiling below about 225° C. at 4 mm. pressure, saponifying the water-insoluble saponifiable materials in the residue, and producing a substantially anhydrous solution of substantial quantities of the resulting soaps in a lubricating oil.

8. The process comprising partially oxidizing aliphatic petroleum hydrocarbons in liquid phase, removing the water-soluble materials from the product, saponifying the water-insoluble saponifiable materials in the product and producing a substantially anhydrous solution of substantial quantities of the resulting soaps and of soaps of higher fatty acids of vegetable or animal origin in a lubricating oil.

9. The process comprising partially oxidizing aliphatic petroleum hydrocarbons in liquid phase, removing the water-soluble materials from the product, saponifying the water-insoluble saponifiable materials in the product to produce sodium soaps, and producing a substantially anhydrous solution of substantial quantities of the resulting soaps and of soaps of higher fatty acids of vegetable or animal origin in a lubricating oil.

10. The process comprising partially oxidizing aliphatic petroleum hydrocarbons in liquid phase, removing from the oxidized product materials boiling below about 225° C. at 4 mm. pressure, saponifying the water-insoluble saponifiable materials in the residue, and producing a substantially anhydrous solution of substantial quantities of the resulting soaps and of soaps of higher fatty acids of vegetable or animal origin in a lubricating oil.

11. The process comprising partially oxidizing aliphatic petroleum hydrocarbons in liquid phase, treating such products with concentrated sulphuric acid, removing from the oxidized product materials boiling below about 225° C. at 4 mm. pressure, saponifying the water insoluble saponifiable materials in the residue, and producing a substantially anhydrous solution of the resulting soaps in a lubricating oil.

SAMUEL EDWARD JOLLY.
WESLEY McILVEEN McKEE.